US012669882B2

(12) United States Patent

Gu et al.

(10) Patent No.: US 12,669,882 B2

(45) Date of Patent: Jun. 30, 2026

(54) DISPLAY PANELS AND ARRAY SUBSTRATES

(71) Applicants: Nanjing BOE Display Technology CO., LTD., Nanjing (CN); BOE Technology Group Co., Ltd., Beijing (CN)

(72) Inventors: Honggang Gu, Beijing (CN); Xianjie Shao, Beijing (CN); Yan Wang, Beijing (CN); Haihong Wang, Beijing (CN)

(73) Assignees: Nanjing BOE Display Technology CO., LTD., Nanjing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/283,249

(22) PCT Filed: Nov. 14, 2022

(86) PCT No.: PCT/CN2022/131782

§ 371 (c)(1),
(2) Date: Sep. 21, 2023

(87) PCT Pub. No.: WO2024/103235

PCT Pub. Date: May 23, 2024

(65) Prior Publication Data

US 2025/0077006 A1     Mar. 6, 2025

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/134309* (2013.01);
(Continued)

(58) Field of Classification Search
CPC .. G06F 3/0412; G06F 3/04164; G06F 3/0443; G02F 1/13338; G02F 1/134309; G02F 1/136286; G02F 1/1368
See application file for complete search history.

(56) References Cited

U.S. PATENT DOCUMENTS

2006/0132684 A1    6/2006    Tanaka
2016/0103547 A1    4/2016    Lu et al.
(Continued)

FOREIGN PATENT DOCUMENTS

CN    1782840 A    6/2006
CN    104330935 A    2/2015
(Continued)

OTHER PUBLICATIONS

Espacenet English machine translation of CN107085481B (Year: 2020).*

(Continued)

*Primary Examiner* — David Y Chung
(74) *Attorney, Agent, or Firm* — IPro, PLLC

(57) ABSTRACT

The present disclosure provides a display panel and an array substrate. The array substrate includes a plurality of pixels forming a plurality of pixel columns, and one pixel includes a plurality of sub-pixels. The array substrate includes: a substrate; a pixel electrode layer, including a plurality of pixel electrodes in one-to-one correspondence with the plurality of sub-pixels; a touch electrode layer, disposed at a side of the pixel electrode layer, where the touch electrode layer includes a plurality of touch electrode cells spaced apart and mutually insulated; where there is a first gap between two t touch electrode cells that are adjacent in a direction of the pixel columns, and the first gap is located between both ends of a pixel electrode along the direction of the pixel columns.

19 Claims, 9 Drawing Sheets

(51) Int. Cl.

| | |
|---|---|
| *G02F 1/1343* | (2006.01) |
| *G02F 1/1362* | (2006.01) |
| *G02F 1/1368* | (2006.01) |
| *G06F 3/044* | (2006.01) |

(52) U.S. Cl.
CPC ...... *G02F 1/136286* (2013.01); *G02F 1/1368* (2013.01); *G06F 3/04164* (2019.05); *G06F 3/0443* (2019.05)

(56) References Cited

U.S. PATENT DOCUMENTS

| | | | |
|---|---|---|---|
| 2016/0224155 A1* | 8/2016 | Kim ....................... | G06F 3/0448 |
| 2017/0276985 A1* | 9/2017 | Jia ......................... | G06F 3/0412 |
| 2017/0336682 A1 | 11/2017 | Lin et al. | |
| 2019/0243495 A1 | 8/2019 | Guo et al. | |
| 2019/0324315 A1 | 10/2019 | Ohashi et al. | |
| 2020/0089371 A1 | 3/2020 | Lee et al. | |
| 2020/0110479 A1 | 4/2020 | Liu et al. | |
| 2024/0105735 A1* | 3/2024 | Yoshino ................ | G06F 3/0412 |

FOREIGN PATENT DOCUMENTS

| | | | | | | |
|---|---|---|---|---|---|---|
| CN | 204576030 U | | 8/2015 | | | |
| CN | 105974685 A | | 9/2016 | | | |
| CN | 107085481 A | | 8/2017 | | | |
| CN | 108107633 A | | 6/2018 | | | |
| CN | 108254987 A | | 7/2018 | | | |
| CN | 109557728 A | | 4/2019 | | | |
| CN | 107085481 B | * | 6/2020 | ......... | G02F | 1/13338 |
| CN | 108107633 B | * | 10/2020 | ......... | G02F | 1/13338 |
| JP | 2002049028 A | | 2/2002 | | | |

OTHER PUBLICATIONS

Espacenet English machine translation of CN108107633B (Year: 2020).*

PCT/CN2022/131782 international search report.

PCT/CN2022/131782 Written Opinion.

* cited by examiner

DISPLAY PANELS AND ARRAY SUBSTRATES

CROSS-REFERENCE TO RELATED APPLICATIONS

This application is a national stage of international PCT Application No. PCT/CN2022/131782 filed on Nov. 14, 2022, the entire contents of which are incorporated herein by reference.

TECHNICAL FIELD

The present disclosure relates to a field of display technologies, and in particular to display panels and array substrates.

BACKGROUND

Along with technical development, the display panels draw more and more attention of the people. However, some display panels are not satisfactory in display effect.

SUMMARY

The object of the present disclosure is to provide a display panel and an array substrate to improve display effect.

According to one aspect of the present disclosure, there is provided an array substrate. The array substrate includes a plurality of pixels forming a plurality of pixel columns, and one of the plurality of pixels includes a plurality of sub-pixels. The array substrate includes:
  a substrate;
  a pixel electrode layer, including a plurality of pixel electrodes in one-to-one correspondence with the plurality of sub-pixels; and
  a touch electrode layer, disposed at a side of the pixel electrode layer, where the touch electrode layer includes a plurality of touch electrode cells spaced apart and mutually insulated: where there is a first gap between two touch electrode cells that are adjacent in a direction of the pixel columns, and the first gap is between both ends of a pixel electrode along the direction of the pixel columns.
  In some embodiments, the each of the plurality of pixel electrodes includes a plurality of strip electrodes disposed side by side and distributed at intervals: where the plurality of strip electrodes extend along a direction intersecting with the direction of the pixel columns; and there is a slit between two adjacent strip electrodes.
  In some embodiments, an orthographic projection of the first gap onto the substrate is between orthographic projections of two adjacent strip electrodes onto the substrate: or, the orthographic projection of the first gap onto the substrate at least partially overlaps an orthographic projection of one of the strip electrodes onto the substrate.
  In some embodiments, each of the plurality of touch electrode cells includes a plurality of touch electrode blocks distributed in an array and electrically connected with each other: where there is a second gap between two touch electrode blocks that are adjacent in the direction of the pixel columns, and the second gap is between both ends of a pixel electrode along the direction of the pixel columns.
  In some embodiments, each of the plurality of pixel electrodes includes a plurality of strip electrodes disposed side by side and distributed at intervals: where the plurality of strip electrodes extend along a direction intersecting with the direction of the pixel columns; and there is a slit between two adjacent strip electrodes:
  where an orthographic projection of the second gap onto the substrate is between the orthographic projections of two adjacent strip electrodes onto the substrate: or the orthographic projection of the second gap onto the substrate at least partially overlaps an orthographic projection of one of the strip electrodes onto the substrate.
  In some embodiments, a sum of lengths, along the direction of the pixel columns, of orthographic projections of at least two pixel electrodes adjacent in the direction of the pixel columns onto the substrate is less than a length, along the direction of the pixel columns, of an orthographic projection of the touch electrode block onto the substrate.
  In some embodiments, the array substrate further includes:
  a plurality of pixel circuits corresponding to the plurality of pixel electrodes: where each of the plurality of pixel circuits includes a switching transistor, where a first source-drain electrode of the switching transistor is connected to a data signal line, a gate electrode of the switching transistor is connected to a scan signal line, and a second source-drain electrode of the switching transistor is connected to one of the plurality of pixel electrodes;
  a plurality of scan signal lines and the plurality of pixel electrodes are alternately arranged along the direction of the pixel columns, and orthographic projections of the scan signal lines onto the substrate are in orthographic projections of the touch electrode cells onto the substrate.
  In some embodiments, a plurality of data signal lines and the plurality of pixel columns are alternately arranged along a direction perpendicular to the direction of the pixel columns, each of the plurality of touch electrode cells includes a plurality of touch electrode blocks distributed in an array and electrically connected with each other, one of the touch electrode blocks is between two adjacent data signal lines: along the direction perpendicular to the direction of the pixel columns, two adjacent touch electrode blocks are at opposite sides of the data signal line.
  In some embodiments, the array substrate further includes:
  a plurality of touch leads, respectively electrically connected to the plurality of touch electrode cells, where one of the touch leads is between two adjacent pixel columns.
  In some embodiments, each of the plurality of touch electrode cells includes a plurality of touch electrode blocks distributed in an array and electrically connected with each other, and the plurality of touch electrode blocks are connected to a same touch lead.
  In some embodiments, the switching transistor is a thin film transistor which includes:
  a gate electrode, disposed at a side of the substrate, where the plurality of the scan signal lines are in the same layer as the gate electrode;
  a first insulation layer, disposed at a side of the gate electrode away from the substrate;
  a source-drain electrode layer, disposed at a side of the first insulation layer away from the substrate, where the touch leads and the data signal lines are in the same layer as the source-drain electrode layer;

the array substrate further includes:

a second insulation layer, disposed at a side of the source-drain electrode layer away from the substrate, where the touch electrode layer is disposed at a side of the second insulation layer away from the substrate;

a third insulation layer, disposed at a side of the touch electrode layer away from the substrate, where the pixel electrode layer is disposed at a side of the third insulation layer away from the substrate.

In some embodiments, one of the plurality of pixels includes three sub-pixels that are distributed along the direction of the pixel columns.

In some embodiments, the array substrate is configured to be applied to a liquid crystal display panel and the touch electrodes are configured to be multiplexed as common electrodes.

According to one aspect of the present disclosure, there is provided a display panel, including:

the array substrate;

a counter substrate, opposite to the array substrate;

a liquid crystal layer, between the array substrate and the counter substrate.

In some embodiments, an alignment direction of a liquid crystal material in the liquid crystal layer is perpendicular to the direction of the pixel columns.

In the related arts, the scan signal lines are between two adjacent pixel electrodes along the direction of the pixel columns: in the array substrate provided by the embodiments of the present disclosure, the first gap between two touch electrode cells is between both ends of a pixel electrode along the direction of pixel columns, such that the scan signal lines and the first gaps can be separated so as to prevent the influence of the electric field between the scan signal lines and the pixel electrode layer on the liquid crystal, thus improving the display effect with an aperture ratio increased.

DETAILED DESCRIPTION

Figure 1:
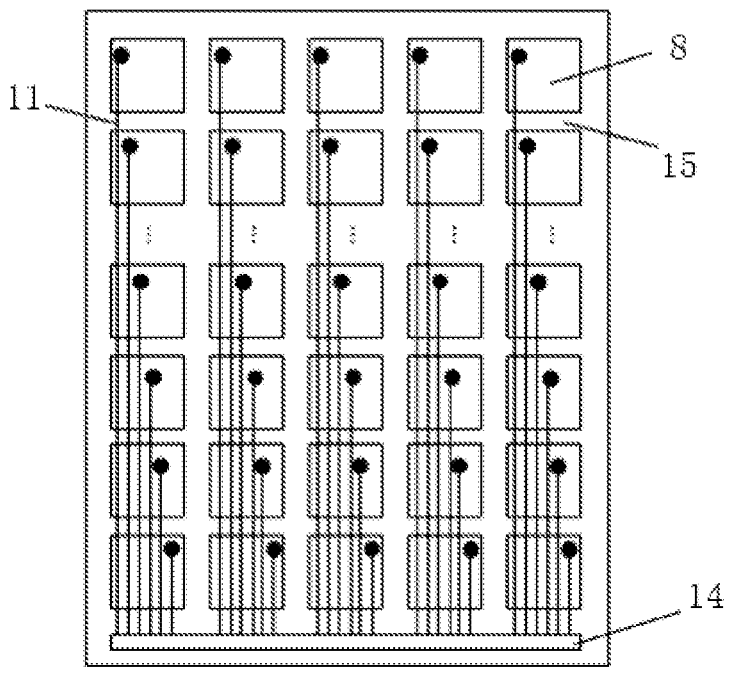
FIG. 1 is a schematic diagram illustrating distribution of touch electrode cells.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses consistent with some aspects of the present disclosure as detailed in the appended claims.

The terms used herein are used to only describe particular embodiments rather than limit the present disclosure. Unless otherwise defined, technical terms or scientific terms used in the present disclosure should have general meanings that can be understood by ordinary persons of skill in the art. The terms such as "first" "second" and the like used in the specification and claims do not represent any sequence, quantity or importance, but distinguish different components. Similarly, the terms such as "one" or "a" and the like do not represent quantity limitation but represent at least one. The term such as "multiple" or "a plurality" represents two or more. Unless otherwise stated, the words such as "front", "rear", "lower" and/or "upper" are used only for ease of descriptions rather than limited to one position or a spatial orientation. Unless otherwise stated, the term "include" or "contain" or the like is intended to refer to that an element or object appearing before "include" or "contain" covers an element or object or its equivalents listed after "include" or "contain" and does not preclude other elements or objects. The term "connect" or "connect with" or the like is not limited to physical or mechanical connection but includes direct or indirect electrical connection. The singular forms such as "a," 'said," and "the" used in the present disclosure and the appended claims are also intended to include plural forms, unless the context clearly indicates otherwise. It is also to be understood that the term "and/or" as used herein refers to and includes any or all possible combinations of one or more associated listed items.

Figure 2:
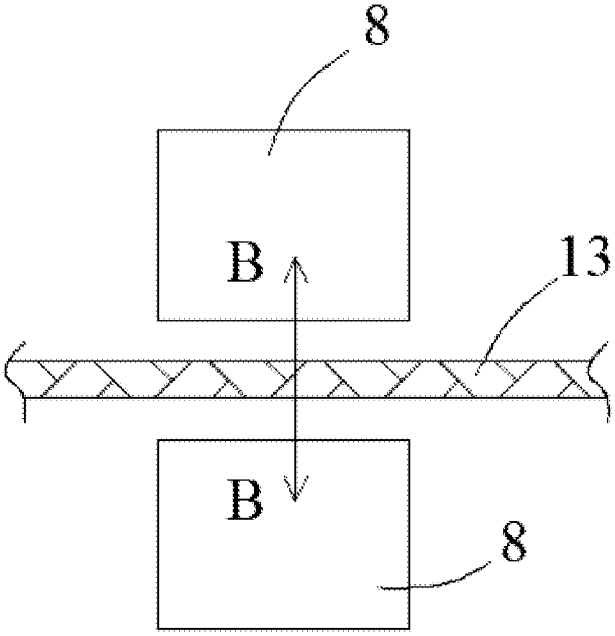
FIG. 2 is a schematic diagram illustrating touch electrode cells and scan signal lines in the related arts.
Figure 3:
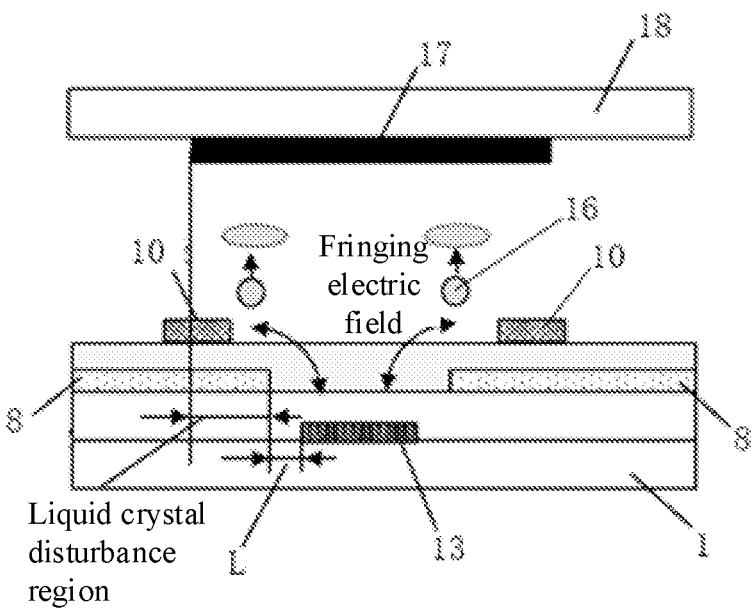
FIG. 3 is a sectional schematic diagram taken along B-B of the structure shown in FIG. 2 in a display panel.

In the related arts, the liquid crystal display panel includes an array substrate, a counter substrate opposite to the array substrate and a liquid crystal layer between the array substrate and the counter substrate. As shown in FIG. 1, FIG. 2, and FIG. 3, the array substrate is provided with a plurality of scan signal lines 13 and a plurality of touch electrode cells 8 distributed in an array. Along a direction of the pixel columns, a first gap 15 is between two adjacent touch electrode cells 8. An extension direction of the scan signal lines 13 is perpendicular to the direction of the pixel columns. As shown in FIG. 2, one of the plurality of scan signal lines 13 is in the first gap 15 and in a gap between adjacent pixel electrodes 10. An alignment layer is on the array substrate and the counter substrate, and an alignment direction of the alignment layer is substantially same as the extension direction of the scan signal lines 13. In a black image state, a major axis direction of the liquid crystal molecules 16 is substantially same as the extension direction of the scan signal lines 13. The pixel electrodes 10 are at a side of the touch electrode cells 8 away from the substrate 1. As shown in FIG. 3, the researchers found that there is an angle between a fringing electric field between the scan signal lines 13 and the pixel electrodes 10 and the major axis of the liquid crystal molecules 16. In this case, the liquid crystal molecules 16 are caused to deflect under the action of the fringing electric field, leading to a liquid crystal disturbance region and affecting the display effect. This region has a width of about 3 µm to 5 µm. A black matrix 17 in the counter substrate needs to fully cover the liquid crystal disturbance region and a gap L between the scan signal lines 13 and the touch electrode cells 8, with a blocking width usually being greater than 10 µm, reducing the pixel aperture ratio.

Figure 4:
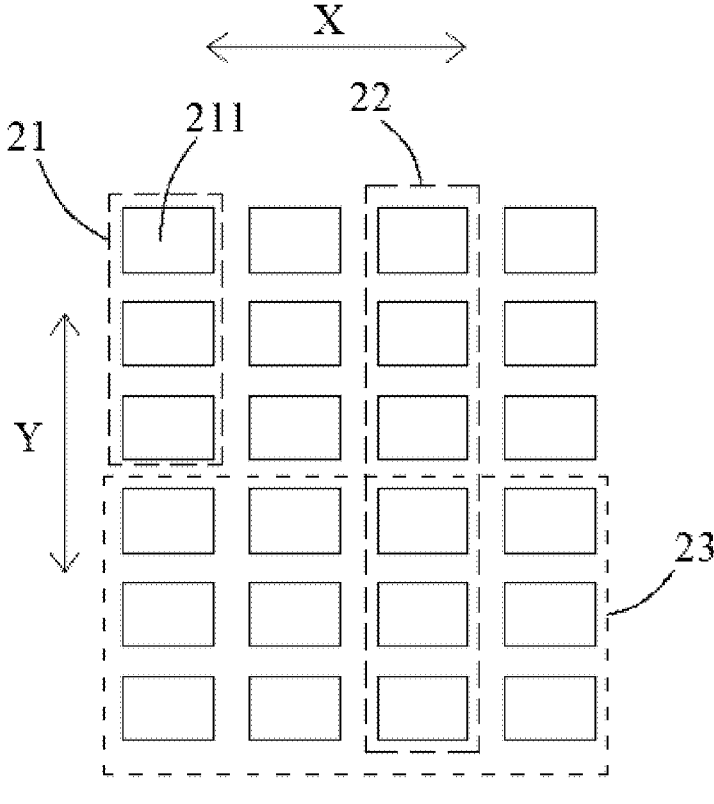
FIG. 4 is a schematic diagram illustrating pixel distribution according to embodiments of the present disclosure.

An embodiment of the present disclosure provides an array substrate. As shown in FIG. 4, the array substrate can include a plurality of pixels 21 which are distributed in an array. The plurality of pixels 21 can form a plurality of pixel columns 22. The pixel columns 22 can include a plurality of pixels 21 distributed along a direction of the pixel column 22 (i.e., Y direction shown in the figure). The pixels 21 in adjacent pixel columns 22 can be aligned with each other such that a plurality of pixel columns 22 can form a plurality of pixel rows 23. A direction of the pixel rows 23 (i.e., X direction shown in the figure) is perpendicular to the direction of the pixel column 22. The pixel rows 23 can include a plurality of pixels 21 distributed along the direction of the pixel rows 23. In other embodiments of the present disclosure, the pixels 21 in adjacent pixel columns 22 can be disposed staggeredly. One pixel 21 can include a plurality of sub-pixels 211. In some embodiments, one pixel 21 can include three sub-pixels 211, for example, a red sub-pixel, a green sub-pixel and a blue sub-pixel. The three sub-pixels 211 in one pixel 21 can be distributed sequentially along the direction of the pixel column 22. As shown in FIG. 5 (*a*), FIG. 5 (*b*), FIG. 6A, FIG. 6B and FIG. 7, the array substrate can include a substrate 1, a pixel electrode layer and a touch electrode layer.

The pixel electrode layer includes a plurality of pixel electrodes 10 which correspond to a plurality of sub-pixels 211. The touch electrode layer is disposed at a side of the pixel electrode layer and includes a plurality of touch electrode cells 8 spaced apart and mutually insulated. Along the direction of the pixel column 22, a first gap 15 is between two adjacent touch electrode cells 8, and the first gap 15 is between both ends of a pixel electrode 10 along the direction of the pixel column 22.

Compared with the related arts in which the scan signal line 13 is between two adjacent pixel electrodes 10 along the direction of the pixel column 22, in the array substrate provided by the embodiments of the present disclosure, the first gap 15 is between both ends of a pixel electrode 10 along the direction of the pixel column 22, such that the scan signal line 13 is separated from the first gap 15. In this way, the influence of the electric field between the scan signal line 13 and the pixel electrode layer on the liquid crystal is avoided and the display effect can be improved with the aperture ratio increased.

The array substrate of the embodiments of the present disclosure will be detailed below.

The substrate 1 can be a rigid substrate. The rigid substrate can be a glass substrate or a Polymethyl methacrylate (PMMA) substrate or the like. In some embodiments, the substrate 1 can also be a flexible substrate.

The pixel substrate layer can be disposed at a side of the substrate 1. The pixel electrode layer can include a plurality of pixel electrodes 10 which are in one-to-one correspondence with a plurality of sub-pixels 211. A plurality of pixel electrodes 10 can be distributed in an array and the plurality of pixel electrodes 10 distributed in an array can form a plurality of electrode columns. A direction of the electrode columns can be same as the direction of the pixel column 22. The electrode columns can include a plurality of pixel electrodes 10 distributed along the direction of the electrode columns. The pixel electrodes in adjacent electrode columns can be aligned with each other such that a plurality of electrode columns can form a plurality of electrode rows. A direction of the electrode rows can be same as the direction of the pixel rows 23. The electrode rows can include a plurality of pixel electrodes 10 distributed along the direction of the electrode rows. Taking three sub-pixels 211 in one pixel 21 being distributed sequentially along the direction of the pixel column 22 as an example, three electrode rows can correspond to one pixel row 23, and one electrode column can correspond to one pixel column 22. In other embodiments of the present disclosure, the pixel electrodes 10 in adjacent electrode columns can be staggered with each other.

Figure 5A:
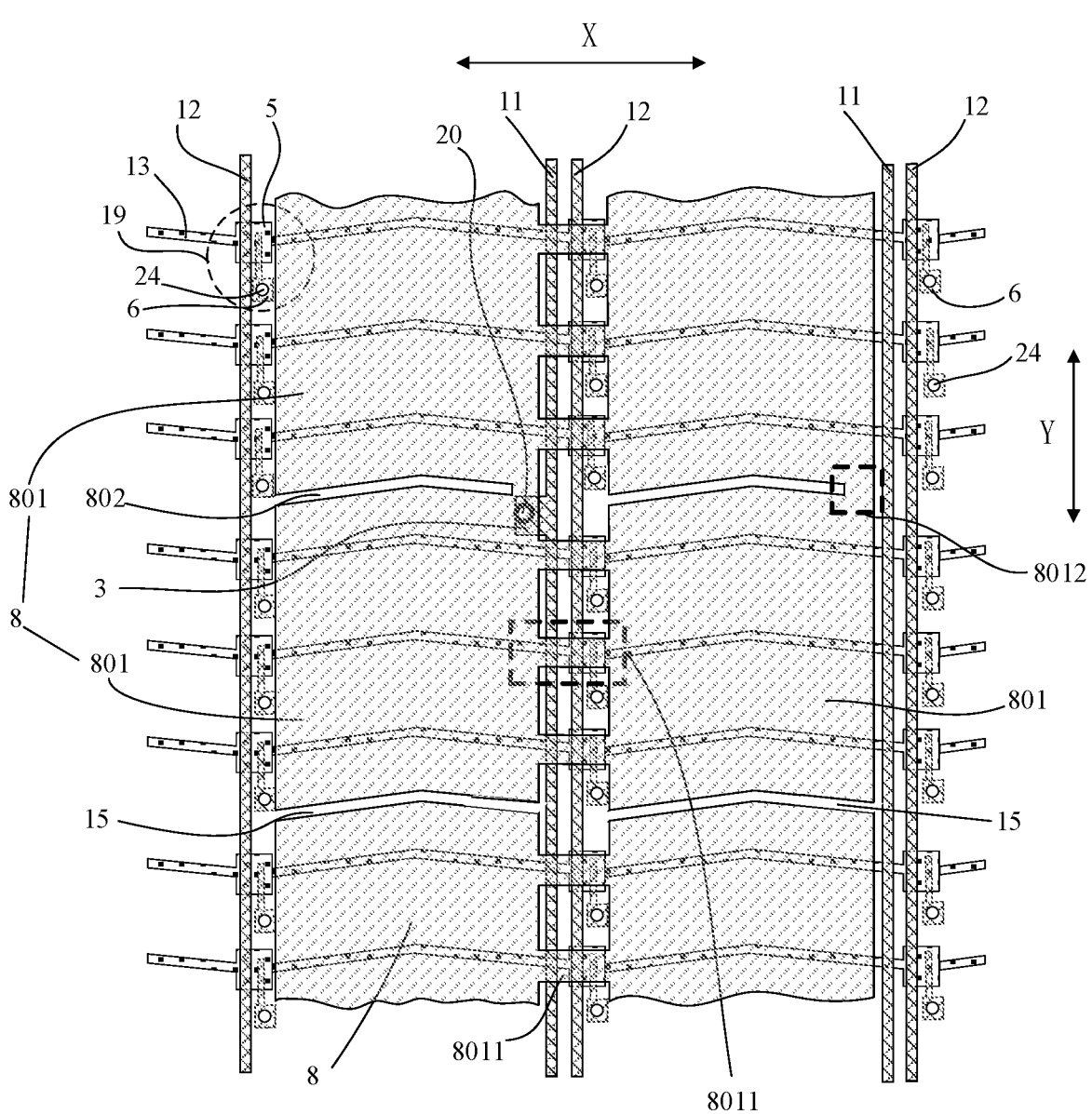
FIG. 5A, FIG. 5B, FIG. 6A, FIG. 6B are schematic diagrams illustrating an array substrate according to embodiments of the present disclosure.
Figure 5B:
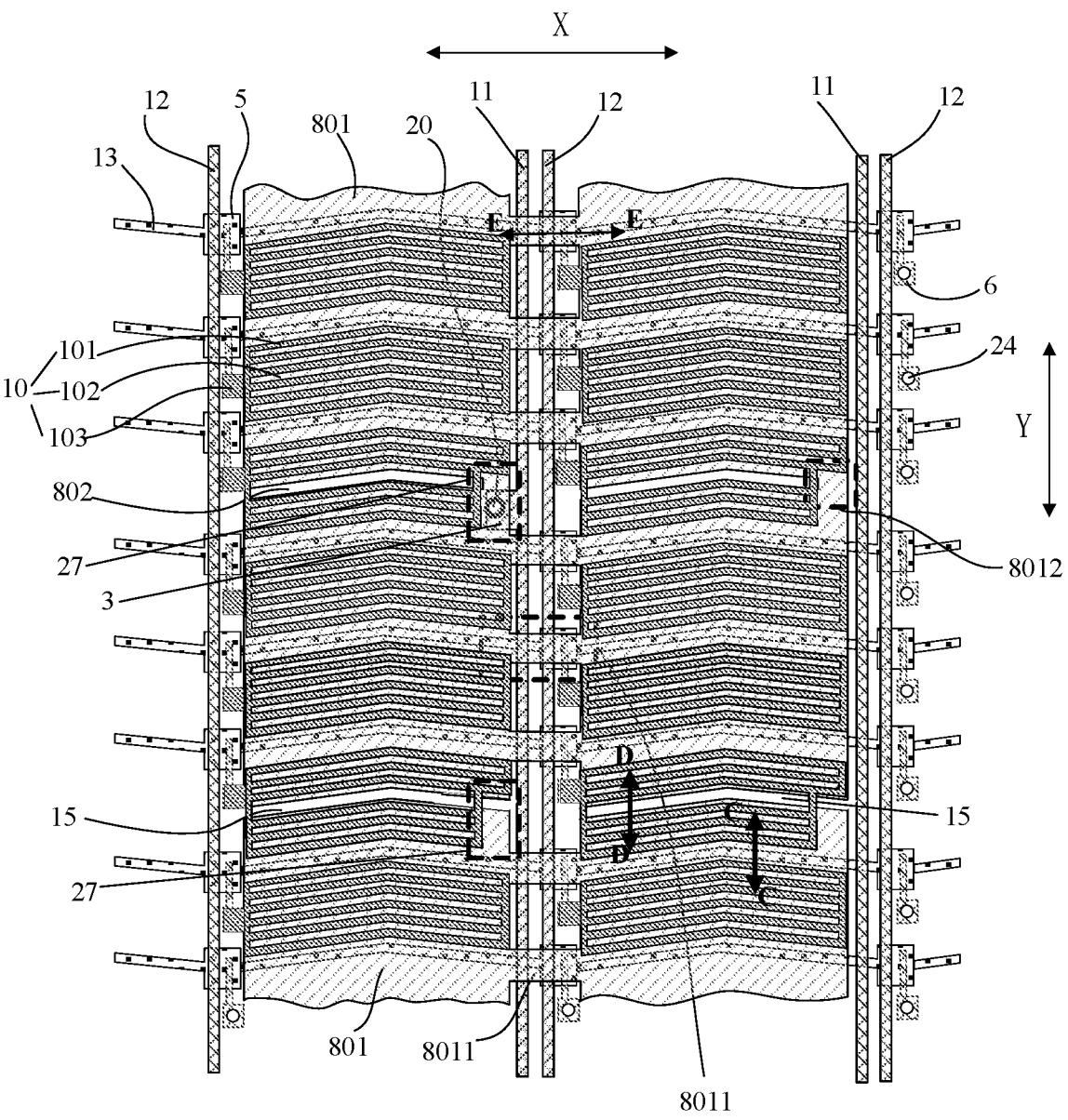

As shown in FIG. 5B, one pixel electrode 10 may include a plurality of strip electrodes 101. The plurality of strip electrodes 101 are disposed side by side and distributed at intervals, and there is a slit 102 between two adjacent strip electrodes 101. The strip electrodes 101 extend along a direction intersecting with the direction of the above pixel columns 22. Furthermore, ends of a plurality of strip electrodes can be electrically connected. Taking one pixel 21 including a red sub-pixel, a green sub-pixel and a blue sub-pixel as an example, the number of strip electrodes 101 in the pixel electrode 10 corresponding to the sub-pixel 211 of each color can be same to ensure light effect homogeneity.

The display panel in the present disclosure can include a plurality of pixel circuits, a plurality of data signal lines 12 and a plurality of scan signal lines 13. The plurality of pixel circuits are in one-to-one correspondence with a plurality of sub-pixels 211, and are connected in one-to-one correspondence with a plurality of pixel electrodes 10. The pixel circuits can include a switching transistor. The switching transistor can be a thin film transistor 19 [see FIG. 6A]. A first source-drain electrode of the switching transistor can be connected to a data signal line 12, a gate electrode 5 of the switching transistor can be connected to a scan signal line 13, and a second source-drain electrode of the switching transistor can be connected to a pixel electrode 10. One of the first source-drain electrode and the second source-drain electrode is a source electrode and the other is a drain electrode.

Figure 6A:
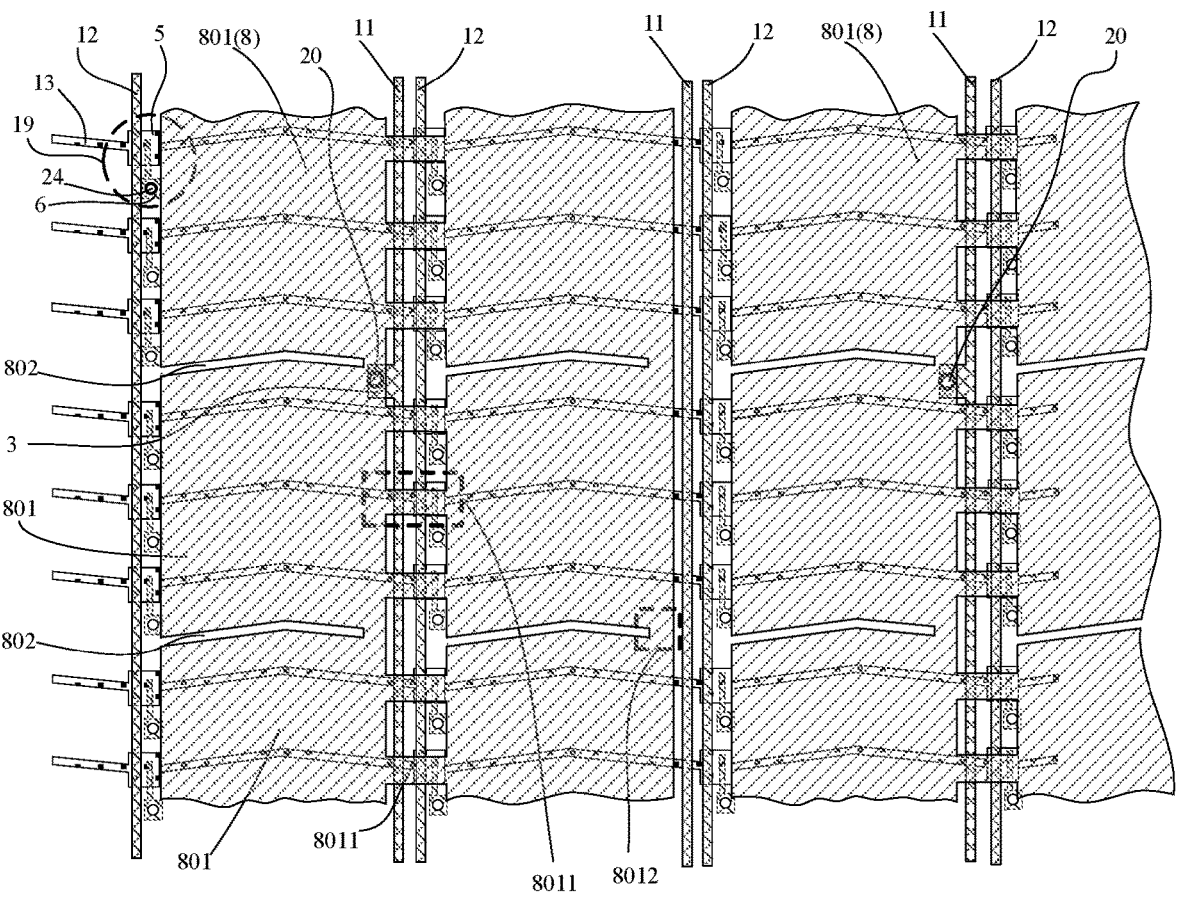
Figure 6B:
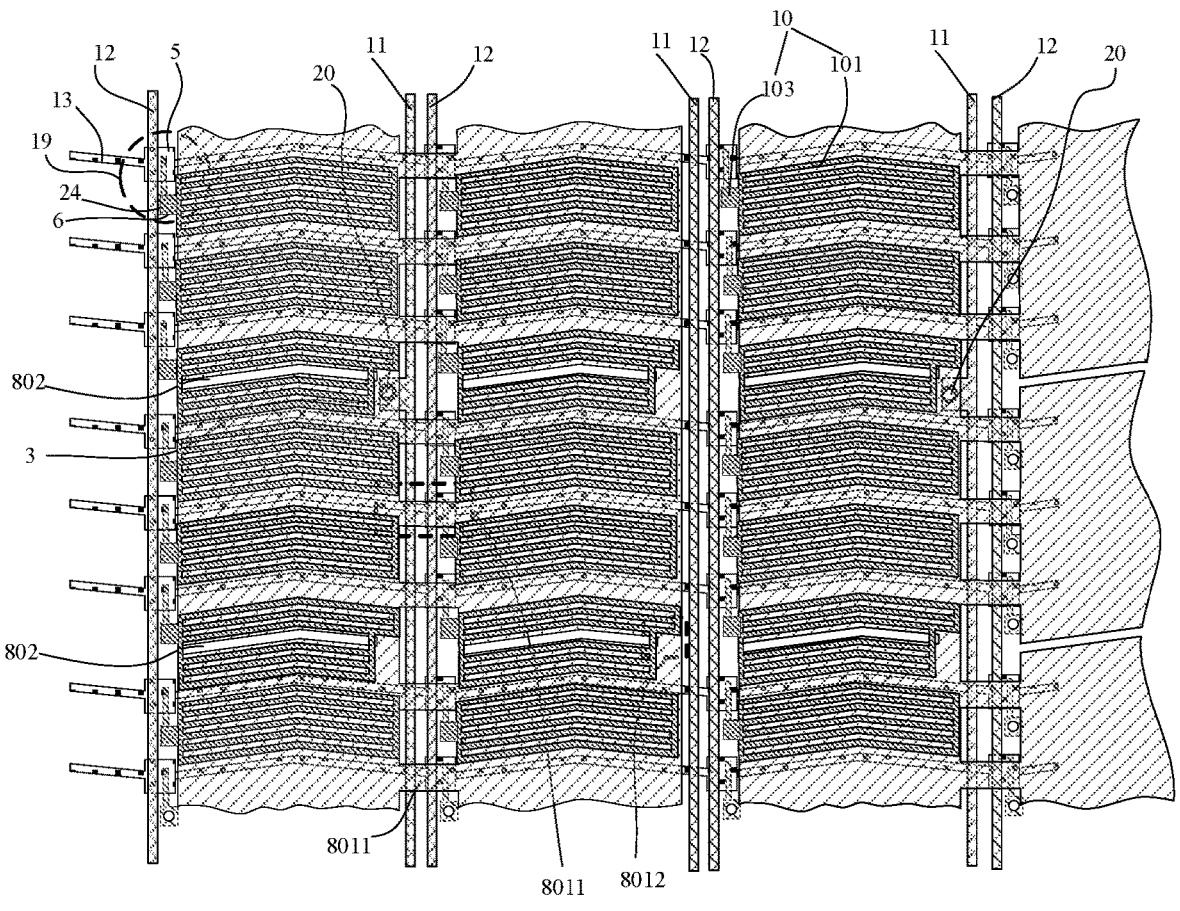

As shown in FIG. 5B and FIG. 6B, there are a plurality of data signal lines 12, and a plurality of sub-pixels 211 in a same pixel column 22 are connected to a same data signal line 12. The data signal lines 12 and the pixel columns 22 are alternately arranged along a direction perpendicular to the direction of the pixel column 22. There are a plurality of scan signal lines 13. The scan signal lines 13 and the pixel electrodes 10 are alternately arranged along the direction of the pixel column 22, and the gate electrodes 5 of the switching transistors of a plurality of sub-pixels 211 in a same pixel row 23 can be connected to a same scan signal line 13.

Figure 7:
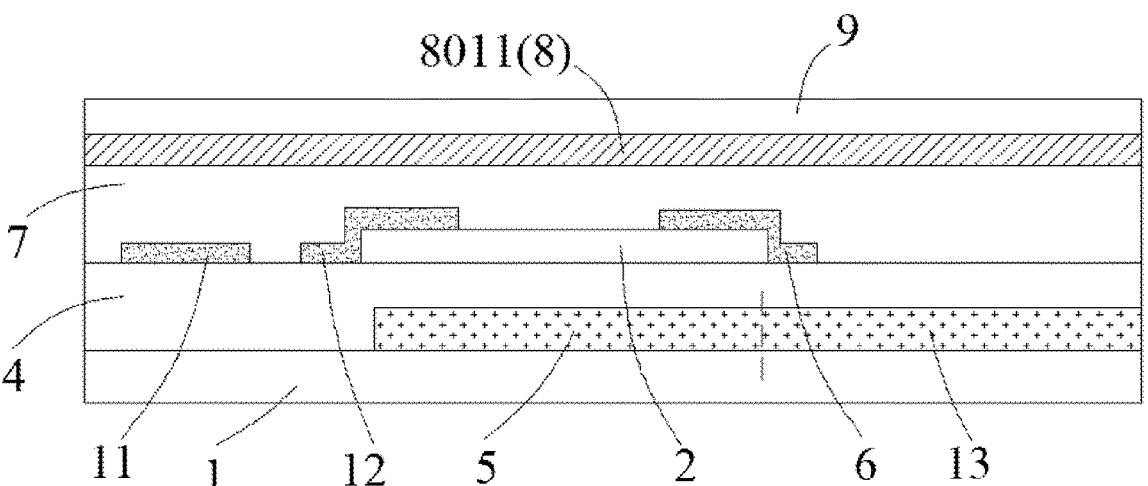
FIG. 7 is a sectional schematic diagram taken along E-E of the structure shown in FIG. 5B in a display panel according to embodiments of the present disclosure.

In some embodiments, as shown in FIG. 5A, FIG. 6A and FIG. 7, the thin film transistor 19 can include a gate electrode 5, a first insulation layer 4 and a source-drain electrode layer 6. The gate electrode 5 can be disposed at a side of the substrate 1. The scan signal lines 13 can be disposed in the same layer as the gate electrode 5 and electrically connected with the gate electrode 5 of the thin film transistor 19. Taking the thin film transistor 19 being a bottom gate thin film transistor as an example, the gate electrode 5 can be disposed on the substrate 1, the first insulation layer 4 can be disposed on a side of the gate electrode 5 away from the substrate 1, and an active layer 2 of the thin film transistor 19 can be disposed at a side of the first insulation layer 4 away from the substrate 1. The first insulation layer 4 is a gate insulation layer. The source-drain electrode layer 6 can be disposed at a side of the active layer 2 away from the substrate 1. The source-drain electrode layer 6 can form a source or drain electrode of the switching transistor. The above data signal lines 12 can be disposed in the same layer as the source-drain electrode layer 6. At least a part region of the data signal lines 12 can be disposed at the side of the active layer 1 away from the substrate 1. An overlapping part between the data signal line 12 and the active layer 2 can form a source or drain electrode of the switching transistor. Taking the source-drain electrode layer 6 forming the drain electrode of the switching transistor as an example, the overlapping part of the data signal line 12 and the active layer 2 can form the source electrode of the switching transistor. The array substrate in the present disclosure can also include an insulation material layer. The insulation material layer can be disposed at a side of the source-drain electrode layer 6 away from the substrate 1. The pixel electrode layer can be disposed at a side of the insulation material layer away from the substrate 1. In other embodiments of the present disclosure, the thin film transistor 19 can also be a top gate thin film transistor, which is not limited herein.

The above touch electrode layer can be disposed at a side of the pixel electrode layer. For example, the touch electrode layer can be disposed at a side of the pixel electrode layer facing toward the substrate 1. In some embodiments, the touch electrode layer can also be disposed at a side of the pixel electrode layer away from the substrate 1. In some embodiments, as shown in FIG. 7, the above insulation material layer can include a second insulation layer 7 and a third insulation layer 9. The second insulation layer 7 can be disposed at a side of the source-drain electrode layer 6 away from the substrate 1. The touch electrode layer (touch electrode cells 8) can be disposed at a side of the second insulation layer 7 away from the substrate 1. The third insulation layer 9 can be disposed at a side of the touch electrode layer away from the substrate 1. The pixel electrode layer is disposed at a side of the third insulation layer away from the substrate 1 and electrically connected to the source-drain electrode layer 6. The array substrate can be provided with a drain via hole 24 [see FIGS. 5A and 5B]. The pixel electrodes 10 can be connected to the source-drain electrode layer 6 through the drain via holes 24. In some embodiments, a convex portion 103 is disposed at a side of the pixel electrodes 10, and the convex portions 103 can be connected to the source-drain electrode layer 6 through the drain via holes 24. There is an overlapping region between an orthographic projection of the convex portion 103 onto the substrate 1 and an orthographic projection of the source-drain electrode layer 6 onto the substrate 1.

As shown in FIG. 1 and FIG. 5A, the touch electrode layer can include a plurality of touch electrode cells 8 spaced apart. A plurality of touch electrode cells 8 can be distributed in an array and mutually insulated, which is not limited herein. For example, the touch electrode layer can be a self-capacitance capacitive touch structure, in which a capacitor can be formed between each touch electrode cell 8 and the ground. A plurality of touch electrode cells 8 can form a plurality of touch columns. A direction of the touch columns can be same as the direction of the pixel column 22. The touch columns can include a plurality of touch electrode cells 8 distributed along the direction of the touch columns. The touch electrode cells 8 in adjacent touch columns can be aligned with each other along a row direction, such that a plurality of touch columns can form a plurality of touch rows. The direction of the touch rows can be same as the direction of the pixel rows 23. The touch rows can include a plurality of touch electrode cells 8 distributed along the direction of the touch rows.

Figure 8:
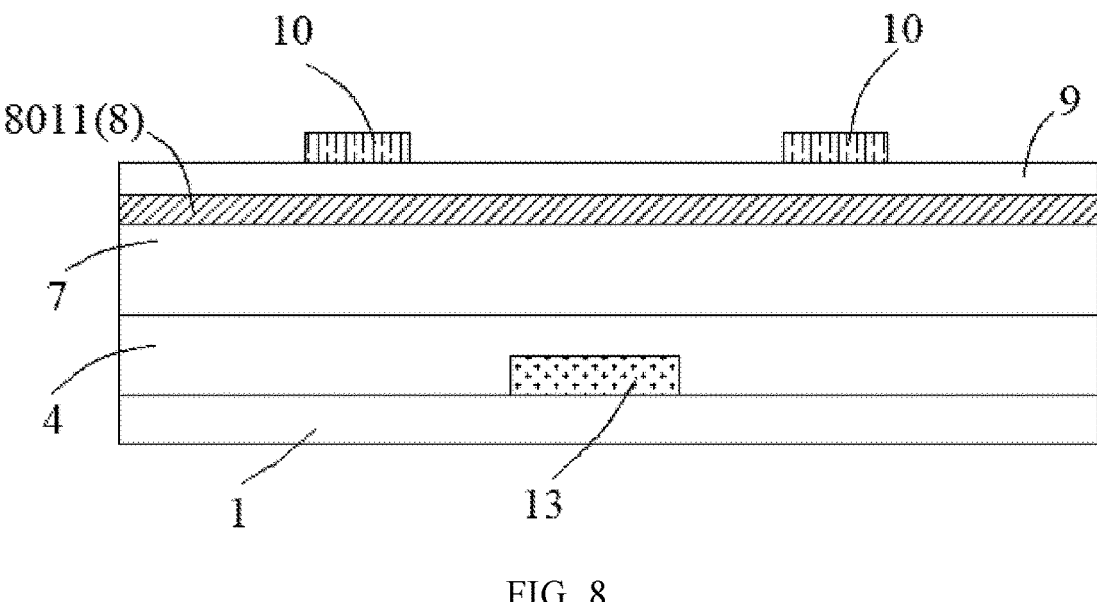
FIG. 8 is a sectional schematic diagram taken along C-C of the structure shown in FIG. 5B in a display panel according to embodiments of the present disclosure.
Figure 9:
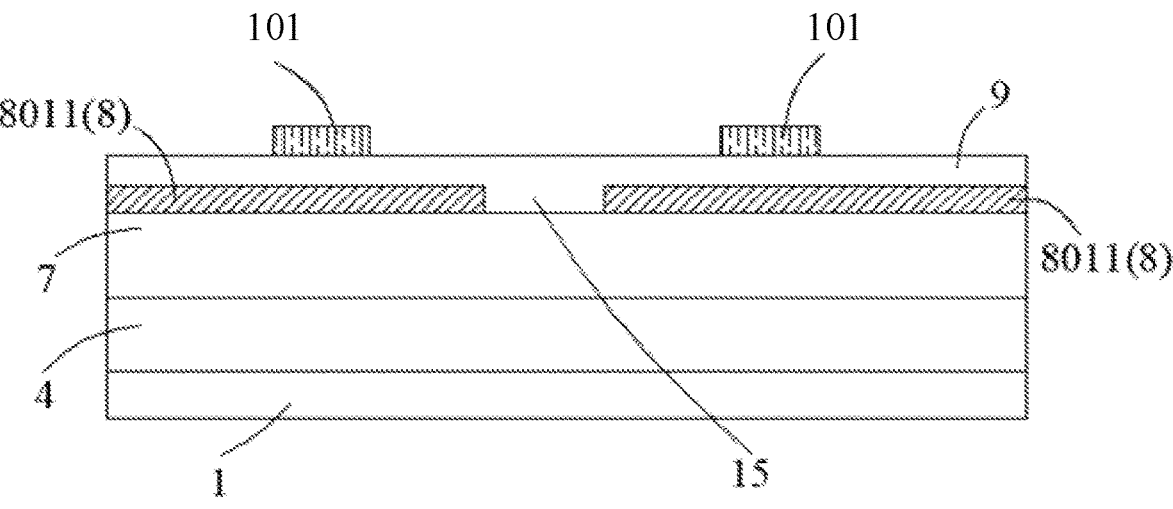
FIG. 9 is a sectional schematic diagram taken along D-D of the structure shown in FIG. 5B in a display panel according to embodiments of the present disclosure.

As shown in FIG. 5A, FIG. 5B and FIG. 9, there is a first gap 15 between two touch electrode cells 8 that are adjacent in the direction of the pixel column 22. Taking a plurality of touch electrode cells 8 forming a plurality of touch rows, the first gap 15 can also be a gap between two adjacent touch rows. The first gap 15 is between both ends of a pixel electrode 10 along the direction of the pixel column 22. In the present disclosure, an orthographic projection of the first gap 15 onto the substrate 1 is a first projection, an orthographic projection of the pixel electrode 10 onto the substrate 1 is a second projection, where the second projection has two boundaries along the direction of the pixel column 22. The first gap 15 is between both ends of a pixel electrode 10 along the direction of the pixel column 22, that is, the first projection is between two boundaries of the second projection, namely the first projection is in the second projection. Furthermore, the first gap 15 can be between both ends of the pixel electrode 10 corresponding to the blue sub-pixel along the direction of the pixel column 22. In addition, as shown in FIG. 8, the scan signal line 13 is between both ends of a touch electrode cell 8 along the direction of the pixel column 22. Taking the pixel electrodes 10 include a plurality of strip electrodes 101 disposed side by side, and the orthographic projection of the first gap 15 onto the substrate 1 can also at least partially overlap the orthographic projection of a strip electrode 101 onto the substrate 1, that is, the first gap 15 at least partially overlaps one of the strip electrodes 101.

In other embodiments of the present disclosure, the orthographic projection of the first gap 15 onto the substrate 1 is between the orthographic projections of two adjacent strip electrodes 101 onto the substrate 1, where the two adjacent strip electrodes 101 are referred to two strip electrodes 101 corresponding to the first gap 15 in the present disclosure. A distance between the two strip electrodes 101 corresponding to the first gap 15 can be greater than a distance between other two adjacent strip electrodes 101, such that the orthographic projection of the first gap 15 onto the substrate 1 can be more easily located between the orthographic projections of the corresponding two strip electrodes 101 onto the substrate 1. Furthermore, the pixel electrode 10 corresponding to the blue sub-pixel can include two strip electrodes 101 corresponding to the first gap 15. For the strip electrodes 101 in all pixel electrodes 10, the distance between any other two adjacent strip electrodes 101 can be equal except for the distance between the two strip electrodes 101 corresponding to the first gap 15, which is not specifically limited herein. Moreover, compared with the case that the first gap 15 at least partially overlaps one of the strip electrodes 101, the orthographic projection of the first gap 15 onto the substrate 1 is between the orthographic projections of a first strip electrode and a second strip electrode onto the substrate 1, which avoids the influence resulting from process fluctuations. For example, it is difficult to achieve that the distances between the strip electrodes 101 and two touch electrode cells 8 that are adjacent in the direction of the pixel column 22 are just equal.

Figure 10:
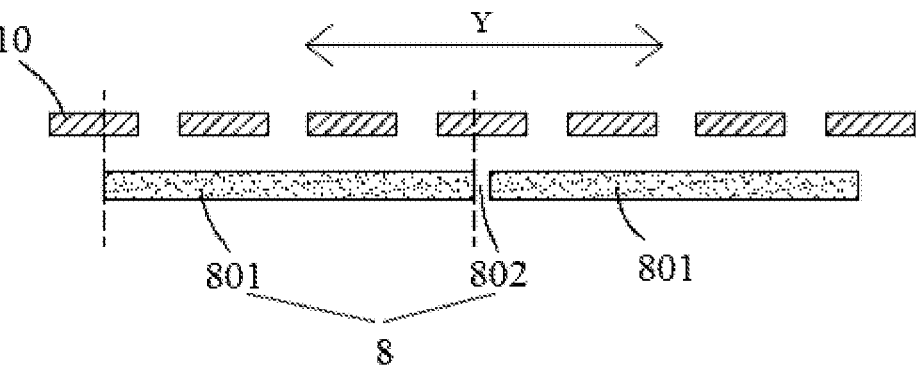
FIG. 10 is a schematic diagram illustrating touch electrode blocks and pixel electrodes according to embodiments of the present disclosure.
Figure 13:
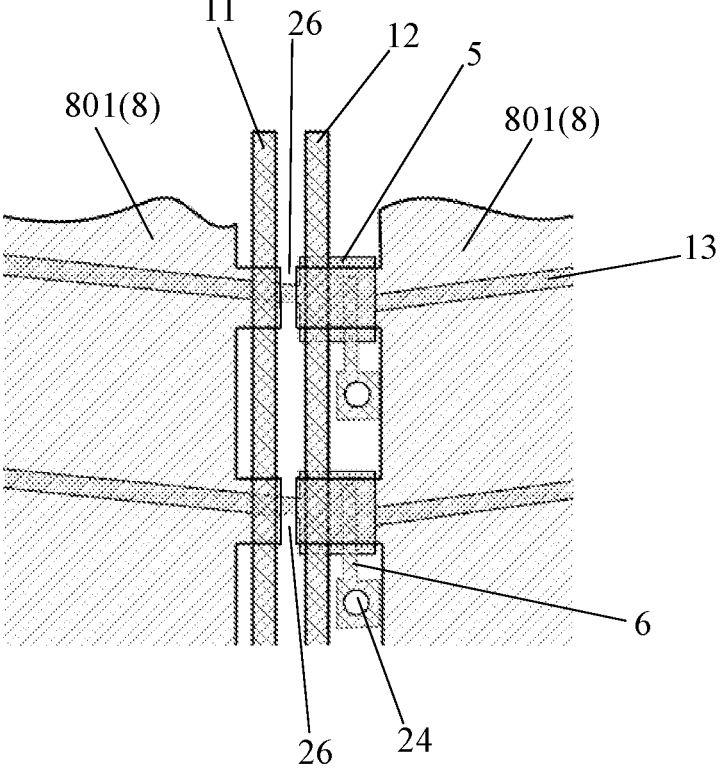
FIG. 13 is a partial schematic diagram illustrating an array substrate according to embodiments of the present disclosure.

As shown in FIG. 5A and FIG. 6A, one touch electrode cell 8 can include a plurality of touch electrode blocks 801 which can be distributed in an array and electrically connected with each other. In some embodiments, along the direction of the pixel column 22 (Y direction shown in the figure), two adjacent touch electrode blocks 801 are electrically connected through a longitudinal connection portion 8012: along the direction of the pixel rows 23 (X direction shown in the figure), two adjacent touch electrode blocks 801 are electrically connected through a transverse connection portion 8011. As shown in FIG. 6A, along the direction of the pixel rows 23, the transverse connection portion 8011 is not disposed between two adjacent touch electrode cells 8 to disconnect the two adjacent touch electrode cells 8. In other embodiments, as shown in FIG. 13, in order to disconnect two adjacent touch electrode cells 8 along the direction of the pixel rows 23, the transverse connection portion 8011 can also be broken off in the present disclosure, that is, an electrode slit 26 is formed on the transverse connection portion 8011. An orthographic projection of the electrode slit 26 onto the substrate 1 can be between an orthographic projection of a touch lead 11 onto the substrate 1 and an orthographic projection of the data signal line 12 onto the substrate 1. In this case, the broken transverse connection portion 8011 has overlapping regions respectively with the touch lead 11 and the data signal line 12 to ensure the coupling capacitances of respective signal lines are homogeneous. As shown in FIG. 6A, FIG. 6B and FIG. 10, along the direction of the pixel column 22, a second gap 802 is between two adjacent touch electrode blocks 801 in the touch electrode cell 8. The second gap 802 is between both ends of a pixel electrode 10 along the direction of the pixel column 22, that is, an orthographic projection of the second gap 802 onto the substrate 1 is in the orthographic projection of the pixel electrode 10 onto the substrate 1. The orthographic projection of the second gap 802 onto the substrate 1 is between the orthographic projections of two adjacent strip electrodes 101 onto the substrate 1, where the two adjacent strip electrodes 101 are referred to as two strip electrodes 101 corresponding to the second gap 802 in the present disclosure. A distance between the two strip electrodes 101 corresponding to the second gap 802 can be equal to the distance between the two strip electrodes 101 corresponding to the first gap 15, and greater than the distance between other two adjacent strip electrodes 101. In this way, the orthographic projection of the second gap 802 onto the substrate 1 can be more easily located between the orthographic projections of the corresponding two strip electrodes 101 onto the substrate 1. Furthermore, the pixel electrode 10 corresponding to the blue sub-pixel can include two strip electrodes corresponding to the second gap 802. For the strip electrodes 101 of all pixel electrodes 10, except for the distance between the strip electrodes 101 corresponding to the first gap 15 and the distance between the two strip electrodes 101 corresponding to the second gap 802, the distance between any other two adjacent strip electrodes 101 can be equal, which is not specifically limited herein. It should be noted that the above first gap 15 and the second gap 802 have a same size, for example, widths of the first gap 15 and the second gap 802 along the direction of the pixel column 22 are equal or substantially equal to ensure entire display homogeneity. In other embodiments of the present disclosure, the orthographic projection of the second gap 802 onto the substrate 1 can also at least partially overlap the orthographic projection of a strip electrode 101 onto the substrate 1. The above scan signal line 13 can be located between touch electrode blocks 801 that are adjacent in the direction of the pixel columns 22.

As shown in FIG. 6B and FIG. 10, a sum of lengths, along the direction of the pixel column 22, of the orthographic projections of at least two pixel electrodes 10 adjacent in the direction of the pixel columns 22 onto the substrate 1 is less than a length, along the direction of the pixel column 22, of the orthographic projection of the touch electrode block 801 onto the substrate 1, that is, the orthographic projections of at least two pixel electrodes 10 adjacent in the direction of the pixel column 22 onto the substrate 1 are located within the orthographic projection of the touch electrode block 801 onto the substrate 1. Taking one pixel 21 including three sub-pixels 211 which are distributed sequentially along the direction of the pixel column 22, a distance between two adjacent second gaps 802 (the first gap 15 is not between the two adjacent second gaps 802) is equal to a width of one pixel row 23, and a distance between the first gap 15 and the second gap 802 adjacent to the first gap 15 is equal to the width of one pixel row 23. Furthermore, as shown in FIG. 5A, the touch electrode block 801 can be between two adjacent data signal lines 12. Along a direction perpendicular to the direction of the pixel column 22, two adjacent touch electrode blocks 801 are at opposite sides of the data signal lines 12.

As shown in FIG. 5A and FIG. 7, the array substrate in the present disclosure further includes a plurality of touch leads 11. The touch leads 11 can be disposed in the same layer as the above data signal lines 12, which is not specifically limited herein. A plurality of touch leads 11 can be respectively electrically connected to a plurality of touch electrode cells 8. The touch leads 11 can be electrically connected to the touch electrode cells 8 through electrode contact holes 20 [see FIG. 5A and FIG. 6B]. Touch connection blocks 3 [see FIG. 5A and FIG. 6A] electrically connected to the touch leads 11 is at a side of a width direction of the touch leads 11. The touch connection blocks 3 can be electrically connected to the touch electrode cells 8 through the electrode contact holes 20. As shown in FIG. 5B, an orthographic projection of the touch connection blocks 3 onto the substrate 1 can be spaced apart from the orthographic projection of the pixel electrodes 10 onto the substrate 1. In some embodiments, the pixel electrode 10 corresponding to the second gap 802 (the orthographic projection of the pixel electrode 10 onto the substrate 1 covers the orthographic projection of the second gap 802 onto the substrate 1) has a notch 27, such that the orthographic projection of the touch connection blocks 3 onto the substrate 1 can be spaced apart from the orthographic projection of the pixel electrode 10 onto the substrate 1. Furthermore, as shown in FIG. 5B, the pixel electrode 10 corresponding to the first gap 15 (the orthographic projection of the pixel electrode 10 onto the substrate 1 covers the orthographic projection of the first gap 15 onto the substrate 1) also has a notch 27. The touch leads 11 are between two adjacent pixel columns 22. A plurality of touch electrode blocks 801 in one touch electrode cell 8 can be connected to a same touch lead 11. The touch leads 11 can be connected to a drive chip 14 (see FIG. 1) so as to enable the drive chip 14 to receive a touch signal. Furthermore, taking the display panel being a liquid crystal display panel as an example, the touch electrodes can be multiplexed as common electrodes and a horizontal electric field, for example, an Advanced Super Dimension Switch (ADS) electric field or an In-Plane Switching (IPS) electric field, can be generated between the touch electrode cells 8 and the pixel electrodes 10.

Figure 11:
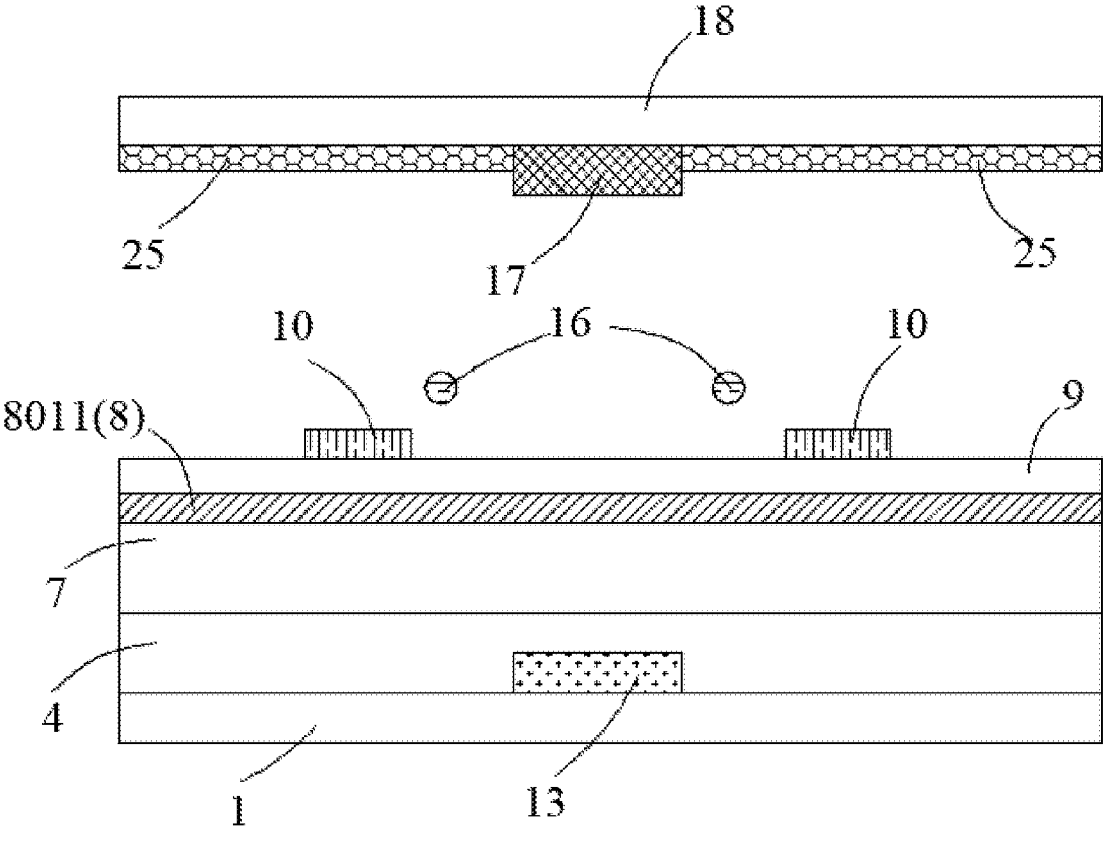
FIG. 11 is a schematic diagram illustrating a display panel provided with a color filter substrate on the basis of the structure of FIG. 8 according to embodiments of the present disclosure.
Figure 12:
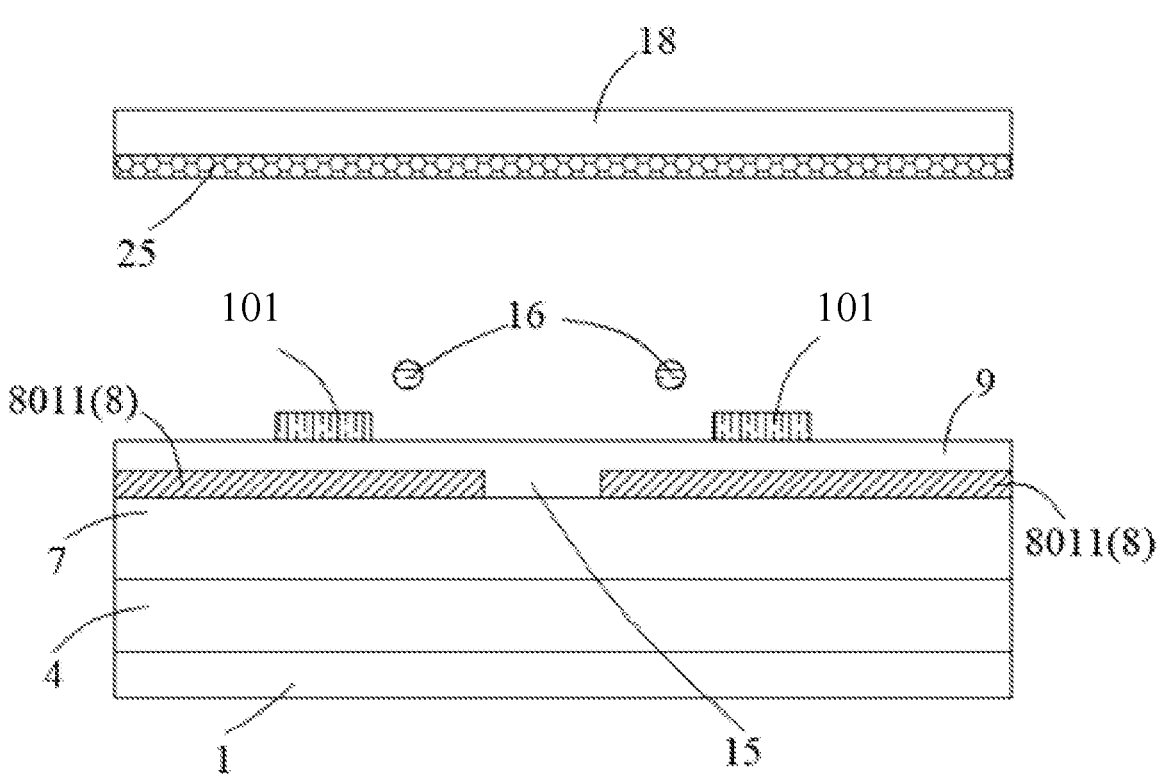
FIG. 12 is a schematic diagram illustrating a display panel provided with a color filter substrate on the basis of the structure of FIG. 9 according to embodiments of the present disclosure.

An embodiment of the present disclosure further provides a display panel which includes an array substrate, a counter substrate and a liquid crystal layer in any one of the above embodiments of the present disclosure. The counter substrate and the array substrate are disposed oppositely, and the liquid crystal layer can be disposed between the array substrate and the counter substrate. The array substrate and/or the counter substrate is provided with an alignment layer. An alignment direction of the alignment layer is perpendicular or substantially perpendicular to the direction of the pixel column 22 (an included angle of 89° to 90° is between the alignment direction of the alignment layer and the direction of the pixel column 22), that is, in a black image state, a major axis direction of the liquid crystal molecules 16 can be substantially perpendicular to the direction of the pixel column 22, which is not specifically limited in the embodiments of the present disclosure. The counter substrate can be a color filter substrate. As shown in FIG. 11 and FIG. 12, the color filter substrate can include a base substrate 18, a black matrix (see FIG. 11) on the base substrate 18, and a plurality of color resist blocks 25. The plurality of color resist blocks 25 are distributed at intervals, and the black matrix 17 surrounds the plurality of color resist blocks 25. The plurality of color resist blocks 25 are in one-to-one correspondence with a plurality of sub-pixels 211. The plurality of color resist blocks 25 can include a red color resist block, a blue color resist block and a green color resist block. The color resist blocks of same color can be connected to form one chain of blocks, and the black matrix 17 divides it into a plurality of color resist blocks 25, helping preparation of the color resist blocks.

The display panel and the array substrate provided by the embodiments of the present disclosure belong to a same invention idea and mutual reference can be made for relevant details and beneficial effects and thus no redundant descriptions are made herein.

The above descriptions are embodiments of the present disclosure rather than intended to limit the present disclosure in any manner. Although the present disclosure is made with embodiments as above, these embodiments are not used to limit the present disclosure. Those skilled in the art can make some changes or modifications to the technical contents of the present disclosure as equivalent embodiments without departing from the scope of the technical solution of the present disclosure. Any simple changes, equivalent changes or modifications made to the above embodiments based on the technical essence of the present disclosure without departing from the contents of the technical solution of the present disclosure shall all fall within the scope of protection of the present disclosure.

The invention claimed is:

1. An array substrate, comprising a plurality of pixels, the plurality of pixels forming a plurality of pixel columns, and one of the plurality of pixels comprising a plurality of sub-pixels, wherein the array substrate further comprises:
   a substrate;
   a pixel electrode layer above the substrate, comprising a plurality of pixel electrodes in one-to-one correspondence with the plurality of sub-pixels; and
   a touch electrode layer, disposed at a side of the pixel electrode layer, wherein the touch electrode layer comprises a plurality of touch electrode cells spaced apart and mutually insulated; wherein there is a first gap between two touch electrode cells that are adjacent in a direction of the pixel columns, and the first gap is between both ends of a same pixel electrode among the plurality of pixel electrodes along the direction of the pixel columns;
   wherein each of the plurality of pixel electrodes comprises a plurality of strip electrodes disposed side by side and spaced apart; wherein the plurality of strip electrodes extend along a direction intersecting with the direction of the pixel columns; wherein there is a slit between two adjacent strip electrodes among the plurality of strip electrodes; and wherein in the same pixel electrode corresponding to the first gap, an orthographic projection of the first gap onto the substrate is between orthographic projections of two adjacent strip electrodes among the plurality of strip electrodes in the same pixel electrode onto the substrate, and a distance between the two adjacent strip electrodes corresponding to the first gap is greater than a distance between other two adjacent strip electrodes in the same pixel electrode.

2. The array substrate of claim 1, wherein an orthographic projection of the first gap onto the substrate is between orthographic projections of two adjacent strip electrodes onto the substrate.

3. The array substrate of claim 1, wherein each of the plurality of touch electrode cells comprises a plurality of touch electrode blocks distributed in an array and electrically connected with each other; wherein there is a second gap between two touch electrode blocks that are adjacent in the direction of the pixel columns, and the second gap is between both ends of a pixel electrode along the direction of the pixel columns.

4. The array substrate of claim 3, wherein each of the plurality of pixel electrodes comprises a plurality of strip electrodes disposed side by side and distributed at intervals; wherein the plurality of strip electrodes extend along a direction intersecting with the direction of the pixel columns; and there is a slit between two adjacent strip electrodes;
   wherein an orthographic projection of the second gap onto the substrate is between orthographic projections of two adjacent strip electrodes onto the substrate.

5. The array substrate of claim 3, wherein a sum of lengths, along the direction of the pixel columns, of orthographic projections of at least two pixel electrodes adjacent in the direction of the pixel columns onto the substrate is less than a length, along the direction of the pixel columns, of an orthographic projection of the touch electrode block onto the substrate.

6. The array substrate of claim 1, further comprising:
   a plurality of pixel circuits corresponding to the plurality of pixel electrodes; wherein each of the plurality of pixel circuits comprises a switching transistor, wherein a first source-drain electrode of the switching transistor is connected to a data signal line, a gate electrode of the switching transistor is connected to a scan signal line, and a second source-drain electrode of the switching transistor is connected to one of the plurality of pixel electrodes;
   a plurality of scan signal lines and the plurality of pixel electrodes are alternately arranged along the direction of the pixel columns, and orthographic projections of the scan signal lines onto the substrate are in orthographic projections of the touch electrode cells onto the substrate.

7. The array substrate of claim 6, wherein a plurality of data signal lines and the plurality of pixel columns are alternately arranged along a direction perpendicular to the direction of the pixel columns, each of the plurality of touch electrode cells comprises a plurality of touch electrode blocks distributed in an array and electrically connected with each other, one of the touch electrode blocks is between two adjacent data signal lines; wherein along the direction perpendicular to the direction of the pixel columns, two adjacent touch electrode blocks are at opposite sides of the data signal line.

8. The array substrate of claim 6, further comprising:

a plurality of touch leads, respectively electrically connected to the plurality of touch electrode cells, wherein one of the touch leads is between two adjacent pixel columns.

9. The array substrate of claim 8, wherein each of the plurality of touch electrode cells comprises a plurality of touch electrode blocks distributed in an array and electrically connected with each other, and wherein the plurality of touch electrode blocks are connected to a same touch lead.

10. The array substrate of claim 8, wherein the switching transistor is a thin film transistor comprising:

a gate electrode, disposed at a side of the substrate, wherein the plurality of scan signal lines are in the same layer as the gate electrode;

a first insulation layer, disposed at a side of the gate electrode away from the substrate;

a source-drain electrode layer, disposed at a side of the first insulation layer away from the substrate, wherein the touch leads and the data signal lines are in the same layer as the source-drain electrode layer;

wherein the array substrate further comprises:

a second insulation layer, disposed at a side of the source-drain electrode layer away from the substrate, wherein the touch electrode layer is disposed at a side of the second insulation layer away from the substrate;

a third insulation layer, disposed at a side of the touch electrode layer away from the substrate, wherein the pixel electrode layer is disposed at a side of the third insulation layer away from the substrate.

11. The array substrate of claim 1, wherein one of the plurality of pixel comprises three sub-pixels that are distributed along the direction of the pixel columns.

12. The array substrate of claim 1, wherein the array substrate is configured to be applied to a liquid crystal display panel and the plurality of touch electrode cells are configured to be multiplexed as common electrodes.

13. A display panel, comprising:

the array substrate according to claim 1;

a counter substrate, opposite to the array substrate;

a liquid crystal layer, between the array substrate and the counter substrate.

14. The display panel of claim 13, wherein the array substrate the counter substrate or both comprises an alignment layer, and an alignment direction of the alignment layer is perpendicular to the direction of the pixel columns.

15. The array substrate of claim 1, wherein the pixel electrode corresponding to the first gap has a notch.

16. The array substrate of claim 3, wherein the second gap is between both ends of a same pixel electrode in the direction of the pixel columns, and an orthographic projection of the second gap onto the substrate is between orthographic projections of two adjacent strip electrodes among the plurality of strip electrodes of the same pixel electrode onto the substrate.

17. The array substrate of claim 16, wherein a distance between two strip electrodes corresponding to the second gap is equal to the distance between the two adjacent strip electrodes corresponding to the first gap, and greater than the distance between other two adjacent strip electrodes.

18. The array substrate of claim 10, wherein the scan signal lines are disposed in a same layer as the gate electrode and electrically connected with the gate electrode of the thin film transistor.

19. The array substrate of claim 10, wherein at least a part region of the data signal lines is disposed at a side of the active layer away from the substrate, and an overlapping part of the data signal line and the active layer form a source electrode of the switching transistor.

\* \* \* \* \*